US007856488B2

(12) United States Patent
Cripe et al.

(10) Patent No.: US 7,856,488 B2
(45) Date of Patent: Dec. 21, 2010

(54) ELECTRONIC DEVICE PROFILE MIGRATION

(75) Inventors: Daniel N. Cripe, Round Rock, TX (US); David Kasperson, Round Rock, TX (US); Charles L. Hudson, Round Rock, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 658 days.

(21) Appl. No.: 11/694,223

(22) Filed: Mar. 30, 2007

(65) Prior Publication Data

US 2008/0244060 A1    Oct. 2, 2008

(51) Int. Cl.
*G06F 15/16* (2006.01)
(52) U.S. Cl. .................. 709/220; 709/221; 709/224; 714/3; 714/4; 714/6; 713/2
(58) Field of Classification Search .............. 714/6, 714/13, 57, 4, 3; 711/162; 713/193, 2; 707/204; 709/220, 221, 224
See application file for complete search history.

(56) References Cited

U.S. PATENT DOCUMENTS

| 6,654,771 | B1 * | 11/2003 | Parham et al. | 707/204 |
| 7,310,736 | B2 * | 12/2007 | Rothbarth et al. | 713/193 |
| 7,383,463 | B2 * | 6/2008 | Hayden et al. | 714/4 |
| 2007/0038887 | A1 * | 2/2007 | Witte et al. | 714/6 |
| 2007/0174673 | A1 * | 7/2007 | Kawaguchi et al. | 714/6 |
| 2007/0220376 | A1 * | 9/2007 | Furukawa | 714/57 |
| 2007/0288710 | A1 * | 12/2007 | Boyd et al. | 711/162 |
| 2007/0294577 | A1 * | 12/2007 | Fiske | 714/13 |

* cited by examiner

*Primary Examiner*—Jungwon Chang

(57) ABSTRACT

A network comprising a first electronic device associated with a first profile that uniquely identifies the first electronic device on the network. The network also comprises a second electronic device coupled to the first electronic device. The first profile is migrated to the second electronic device such that the first electronic device is no longer associated with the first profile and such that the first profile uniquely identifies the second electronic device on the network.

16 Claims, 3 Drawing Sheets

ELECTRONIC DEVICE PROFILE MIGRATION

BACKGROUND

Networks may comprise multiple computers (e.g., servers). In some networks, a first server may be designated as a primary server and a second server may be designated as a backup server. If the first server suffers from a technical problem that precludes it from operating properly, the backup server may perform the duties of the first server. Similarly, in some networks, a first server may be designated as a primary server and a second server may be designated as an upgrade server. The second server may be more powerful than the first server in terms of speed, storage space, etc. It may be desirable to have the upgrade server perform the duties of the first server.

In such cases, because the second server assumes the responsibilities of the first server, it is necessary to migrate a "profile" (i.e., low-level hardware identifiers such as media access control (MAC) addresses, Fibre Channel World Wide Names, storage area network (SAN) boot parameters, etc.) of the first server to the second server so that the second server can perform in lieu of the first server. However, such migration poses various technical difficulties which increase both migration time and server downtime.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
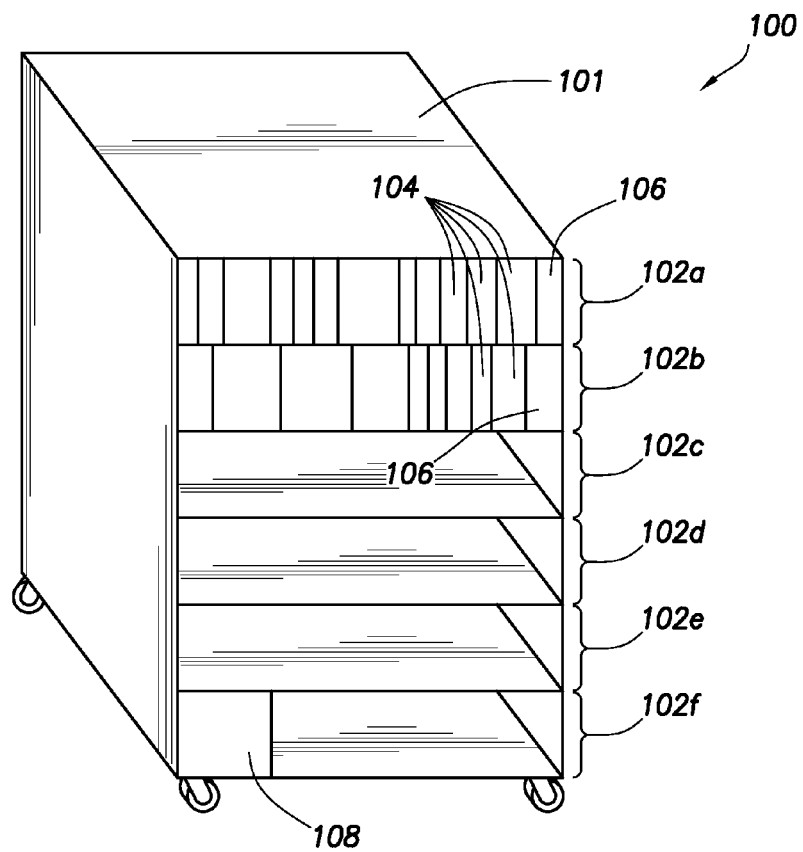
FIG. 1 shows a system in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct or indirect electrical connection.

As used herein, the term "profile" refers to one or more identifiers associated with a computer (e.g., a server). More specifically, an identifier of a computer comprises a low-level hardware identifier that may, for example, be hard-coded onto the computer. Examples of such identifiers include media access control (MAC) addresses, Fibre Channel World Wide Names, storage area network (SAN) boot parameters and computer/server serial numbers. A profile associated with a computer may uniquely identify that computer among a plurality of computers (e.g., on a network). For example, on a network having multiple computers, each computer's MAC address may be different from the MAC addresses of the other computers. Further, a profile associated with a computer may identify that computer to software running on that computer. For example, a profile associated with a server may comprise a server serial number. Licensing software running on that server may use the server serial number to identify the server hardware.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Described herein are techniques which positively affect the efficiency of a profile migration from a first server (e.g., a failed server or a server with outdated technology) to a second server (e.g., a backup server or a server with upgraded technology). More specifically, the techniques disclosed herein enable a network administrator or other network authority to transfer a profile—including one or more Globally Unique Identifiers (GUIDs)—from a first server to a second server, thereby enabling the second server to assume the duties of the first server with reduced or minimal server downtime.

FIG. 1 shows an illustrative system 100 comprising an electronic device container 101. The container 101 may have, for example, a cuboidal shape and may be composed of metal, plastic, fiberglass and/or any other suitable material. In at least some embodiments, the container 101 may comprise a server rack. The container 101 comprises one or more enclosures 102a-102f. Each enclosure is capable of storing one or more electronic devices 104 (e.g., blade servers, switches, power supplies). The electronic devices are controlled by one or more enclosure managers 106. In some embodiments, each enclosure has its own enclosure manager 106 which manages electronic devices 104 in that enclosure, as shown in FIG. 1. In other embodiments, the container 101 may have a single enclosure manager which manages some or all electronic devices in the container 101. In still other embodiments, the container 101 may have a primary enclosure manager that manages secondary enclosure managers which, in turn, manage the electronic devices. Other management techniques also are possible and are within the scope of this disclosure. Although not specifically shown, in at least some embodiments, each enclosure manager 106 comprises circuit logic including a processor, a storage (e.g., random access memory (RAM), non-volatile memory (NVM)), etc. In addition to enclosure managers 106 and electronic devices 104, one or more power supplies 108 may be included in the container 101. Such power supplies may convert alternating current (AC) power to one or more suitable direct current (DC) voltages for the various electronic devices 104 and enclosures 106.

Figure 2:
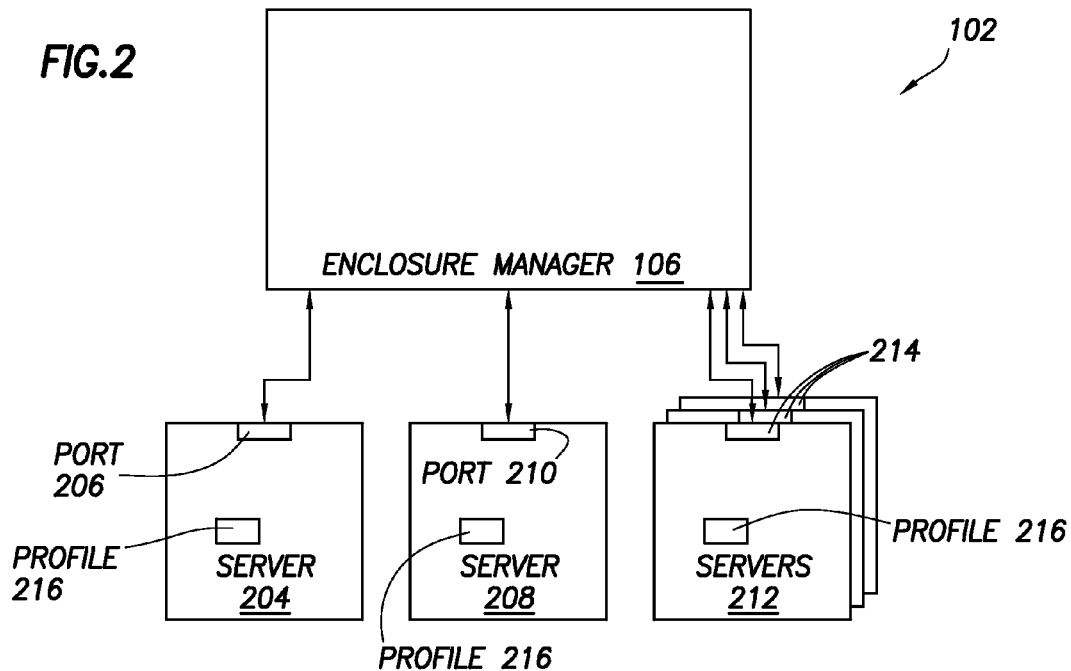
FIG. 2 shows a block diagram of the system of FIG. 1, in accordance with various embodiments.

FIG. 2 shows an illustrative block diagram of an enclosure 102. As previously explained, the enclosure 102 comprises an enclosure manager 106. In the example of FIG. 2, the enclosure 102 further comprises a server 204 having a port 206, a server 208 having a port 210 and one or more additional servers 212 having ports 214. Although the techniques disclosed herein are discussed in terms of two servers housed within a common enclosure 102, the scope of this disclosure also encompasses embodiments in which these techniques may be modified for multiple servers housed within the same or different enclosures. Further, the scope of this disclosure encompasses embodiments in which these techniques may be modified for multiple servers which are housed in different containers 101 or even in different geographic locations (e.g., different locations of a city, state, country or internationally). The ports 206, 210 of servers 204 and 208 enables the servers to communicate with the enclosure manager 106. Via the ports, the enclosure manager 106 transfers information to and receives information from the servers 204 and 208.

As mentioned, each server in the enclosure 102 comprises a profile 216. The profile 216 comprises one or more low-level hardware identifiers, such as a media access control (MAC) address, a Fibre Channel World Wide Name, storage area network (SAN) boot parameter, etc. A profile uniquely identifies the corresponding server. In accordance with at least some embodiments, the profile includes information that identifies the server to other electronic devices with which the server interacts. The server profiles are transferable from one server to another.

Figure 3:
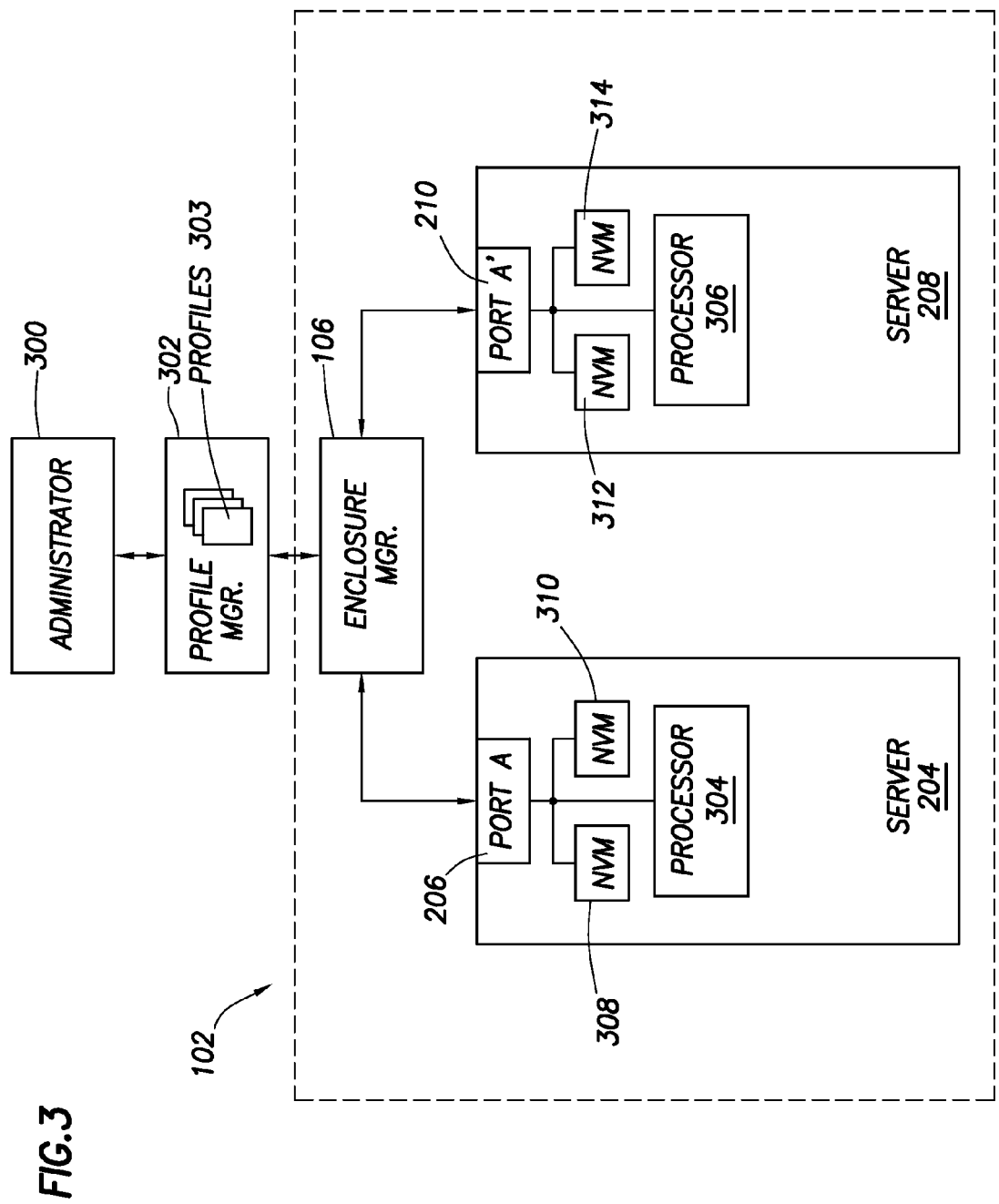
FIG. 3 shows another block diagram of the system of FIG. 1, in accordance with various embodiments.

FIG. 3 shows a detailed version of the enclosure 102 and associated logic. More specifically, FIG. 3 shows an administrator 300 (e.g., an administrative computer) that couples to a profile manager 302 comprising multiple profiles 303. In accordance with at least some embodiments, the profile manager 302 comprises a computer or other suitable circuit logic containing NVM in which data structures such as the profiles 303 are stored. The profile manager 302 couples to the enclosure manager 106 of the enclosure 102. The enclosure manager 106 couples to the servers 204 and 208. The server 204 comprises port 206, which couples to a processor 304, a NVM 308 and another NVM 310. The server 208 comprises the port 210 which couples to a processor 306, a NVM 312 and another NVM 314. The NVMs 308, 310, 312 and 314 may include, for instance, read-only memory (ROM), flash memory, hard disks, optical discs, etc. The arrangement of hardware shown in FIG. 3 is illustrative of some embodiments. The scope of this disclosure is not limited to any particular hardware arrangement. For example, although the NVMs 308 and 310 and the NVMs 312 and 314 are shown as being separate storage devices, in some embodiments, the NVMs 308 and 310 may be replaced with a single NVM. Likewise, the NVMs 312 and 314 may be replaced with a single NVM.

The profile manager 302 comprises one or more profiles (e.g., data structures) 303, each of which is associated with a different server. The servers 204 and 208 each have a profile that differs from the profile of the other server. The administrator 300 issues commands to the profile manager 302 whereby the profiles 303 are managed. For example, the administrator 300 may command the profile manager 302 to assign a specific profile 303 to a specific server within the enclosure 102.

Profiles may be generated by any suitable technique. In some embodiments, a profile 303 may be generated by the administrator 300 and transferred to the profile manager 302. In other embodiments, a profile may be generated by the profile manager 302. Profiles may be generated manually (i.e., with human intervention) or automatically (i.e., without human intervention) by the administrator 300 or by the profile manager 302. In some embodiments, a server may already contain a profile when the server is installed in the enclosure 102. The profile on the installed server may be read by the enclosure manager 106 and a copy of the profile may be transferred to the profile manager 302 for storage. The scope of the disclosure is not limited to these techniques for profile generation.

A generated profile 303 may be assigned to a server by the administrator 300. In an illustrative embodiment, the administrator 300 may send a command to the profile manager 302 that a specific profile 303 is to be assigned to server 204. The profile manager 302 receives the command and, in turn, issues a command to the enclosure manager 106. In at least some embodiments, the command issued by the profile manager 302 to the enclosure manager 106 is generated using the specific profile 303 that is to be assigned to server 204. For example, if the specific profile 303 comprises a MAC address of 000135288134, an illustrative command sent from the profile manager 302 to the enclosure manager 106 may be:

set netport206 PermanentAddress=000135288134

This command instructs the enclosure manager 106 to set port 206 to an address (e.g., a MAC address) of 000135288134. Upon receiving the command from the profile manager 302, the enclosure manager 106 reads the command to determine which server port should receive the command. Because the command is directed to port 206, the enclosure manager 106 forwards the command to port 206 which is associated with server 204. Once received by the port 206, the processor 304 may execute and/or store the command in NVM 308, which in some embodiments comprises a memory dedicated to storing received commands. Executing the command causes the processor 304 to set the MAC address of the port 206 to 000135288134. In at least some embodiments, a MAC address of the port 206 is set by adjusting a data structure stored in NVM 310. Such a data structure may contain an entry for addresses or other properties associated with the port 206, and such an entry may be modified to contain the MAC address 000135288134.

When a specific profile 303 is assigned to a server such as server 204, additional properties besides a MAC address also may be applied to the server 204. Such properties include those described above as being associated with a profile 303. Thus, in some embodiments, when a profile 303 is assigned to a server, one or more of the properties associated with the profile 303 may be applied to the server 204. A profile may similarly be applied to the server 208 and any other servers or electronic devices that may be present in the enclosure 102.

Due to any of a variety of reasons, a first server may be precluded from operating properly (i.e., the server may "fail"). For example, the first server may become overheated, may short-circuit, may lose power, may contract a virus, etc. In some cases, the first server may perform duties that need to be transferred to an upgraded, more powerful server. In any such cases, it may be necessary for a second server (e.g., a "backup" server or an "upgraded" server) to assume the duties of the first server. The "transfer of duties" from the first server to the second server is known as "migration." Migrating from a first server to a second server may include the transfer of various properties, settings, etc. associated with the first server to the second server. In some cases, migration requires substantial server downtime. For example, in a business, migration may require the prior authorization of unavailable technical personnel. Likewise, the technical process of migration itself may often be tedious and time-consuming. If the first server was performing some vital task (e.g., stock trades for a stockbroker), even a small amount of server downtime can result in the loss of considerable amounts of revenue. Thus, in accordance with various embodiments and as described below, a server failure or a server upgrade request causes the administrator to transfer the profile of the first server, including one or more GUIDs associated with the profile, to a second server. In this way, migration is performed more efficiently than in other systems.

If server 204 fails, the enclosure manager 106 detects the failure at least in part because the failed server 204 will cease to respond to communications from the enclosure manager 106. Upon detecting that the server 204 has failed, the enclosure manager 106 may send a notification to the administrator 300 by way of the profile manager 302. The notification may be handled by the administrator 300 in various ways. If the administrator is being controlled by a human entity, a visual and/or audio message may be displayed or played for the user, and the user may take appropriate measures. Other failure detection techniques also may be used.

Upon determining that the server 204 has failed, the administrator 300 responds by sending a command to the profile manager 302. The command sent to the profile manager 302 instructs the profile manager 302 to restore the profile of the failed server 204 to its factory-default profile, a previously assigned profile or, in some embodiments, to change the profile of the server 204 to some predetermined profile intended to be assigned to failed servers. The command also instructs the profile manager 302 to assign the profile previously associated with the server 204 at the time of failure to the backup server 208. In some embodiments, if a server having a profile is moved from one enclosure to a new (i.e., different) enclosure, that server's profile is replaced from a default, predetermined profile. In at least some such embodiments, the enclosure manager of the new enclosure performs this profile replacement.

Upon receiving this command from the administrator 300, the profile manager 302 adjusts its data structure(s) (e.g., profiles 303) to reflect that the profiles assigned to the failed server 204 and the backup server 208 have been changed as described above. If the backup server 208 already had an associated profile before assuming the profile of the failed server 204, that associated profile may be stored elsewhere (e.g., on the profile manager 302) for possible future use.

In addition to adjusting its data structures, the profile manager 302 issues commands to the enclosure manager 106. One of these commands may be used to adjust the profile associated with the failed server 204 and the other command is used to adjust the profile associated with the backup server 208. More specifically, the enclosure manager 106 receives the commands and, in turn, issues commands to the failed and backup servers to adjust the MAC addresses associated with each of the servers. For example, the enclosure manager 106 issues the string commands:

set netport206 PermanentAddress=000000000000 which is sent to the port 206 of the failed server 204, and set netport210 PermanentAddress=000135228134 which is sent to the port 210 of the backup server 208. The string command sent to the port 206 of failed server 204 causes the server 204 to adjust the data structure stored in NVM 310 so that the MAC address associated with the failed server 204 is 000000000000. The MAC address 000000000000 is used for illustrative purposes and another MAC address more suitable for a particular implementation may be used instead. The string command sent to the port 210 of the backup server 208 causes the server 208 to adjust its MAC address to be 000135228134, which was the MAC address of the failed server 204 at the time of failure.

More specifically, the "set netport210" command from the enclosure manager 106 may be provided to the processor 306 and/or stored to the NVM 312, which may comprise a memory dedicated to storing commands from the enclosure manager 106. The processor 306, upon executing the command, adjusts a data structure stored in the NVM 314 which associates port 210 with a MAC address. Thus, the data structure in the NVM 314 may be adjusted to associate port 210 with the MAC address 000135228134. Other profile properties formerly associated with the failed server 204 also may be applied to the server 208 as instructed by the administrator 300, the profile manager 302 and/or the enclosure manager 106. Any previous profile data associated with the backup server 208 may be overwritten by the new profile data from the failed server 204. In some embodiments, the previous profile data of the backup server 208 may be transferred to a storage in the backup server 208 for future use prior to being overwritten by the new profile data.

In this way, a profile (i.e., one or more GUIDs) formerly associated with the failed server 204 is now assigned to the backup server 208. Because the backup server 208 is associated with a GUID formerly associated with the failed server 204, any privileges the failed server 204 had to certain devices, resources, etc., as well as any communications that would have previously been sent to the failed server 204 by the enclosure manager 106, are now provided to the server 208. This is at least in part because, among the servers in the enclosure 102, the GUID is unique to the server 208. Stated otherwise, in at least some embodiments, no active (i.e., properly functioning) and/or inactive electronic device that is communicably coupled with the server 208 (e.g., within an enclosure and/or within a network) is associated with the same GUID as the server 208. The failed server 204 adjusts its profile (including its MAC address and other GUID(s), if any) in a manner similar to that by which the server 208 adjusts the profile of server 208. It is assumed that the server 204, despite failure, is still able to adjust the server 204 profile.

The migration of profiles as described herein may apply across geographical boundaries. For example, a failed server may be included in one enclosure 102 (e.g., in the United States) and a backup server may be included in a different enclosure (e.g., in China). In such embodiments, the infrastructure described above may be modified as needed to migrate the profile of the failed server in the United States to the backup server in China. For example, the profile manager 302 may have access to an international network which includes both the enclosure 102 and the enclosure in China. In this way, the profile manager 302 may communicate with the enclosure manager of each enclosure and thus may migrate the profile of the failed server to a backup server in a different geographical location. In such embodiments, the GUID(s) of the profile migrated from the server in the U.S. to the server in China is unique within the international network. Stated otherwise, any GUID(s) migrated from the failed server to the backup server are not associated with any other active and/or inactive server(s) or electronic devices on the same network as the failed server and/or backup server. In this way, profile/GUID duplication is avoided.

Figure 4:
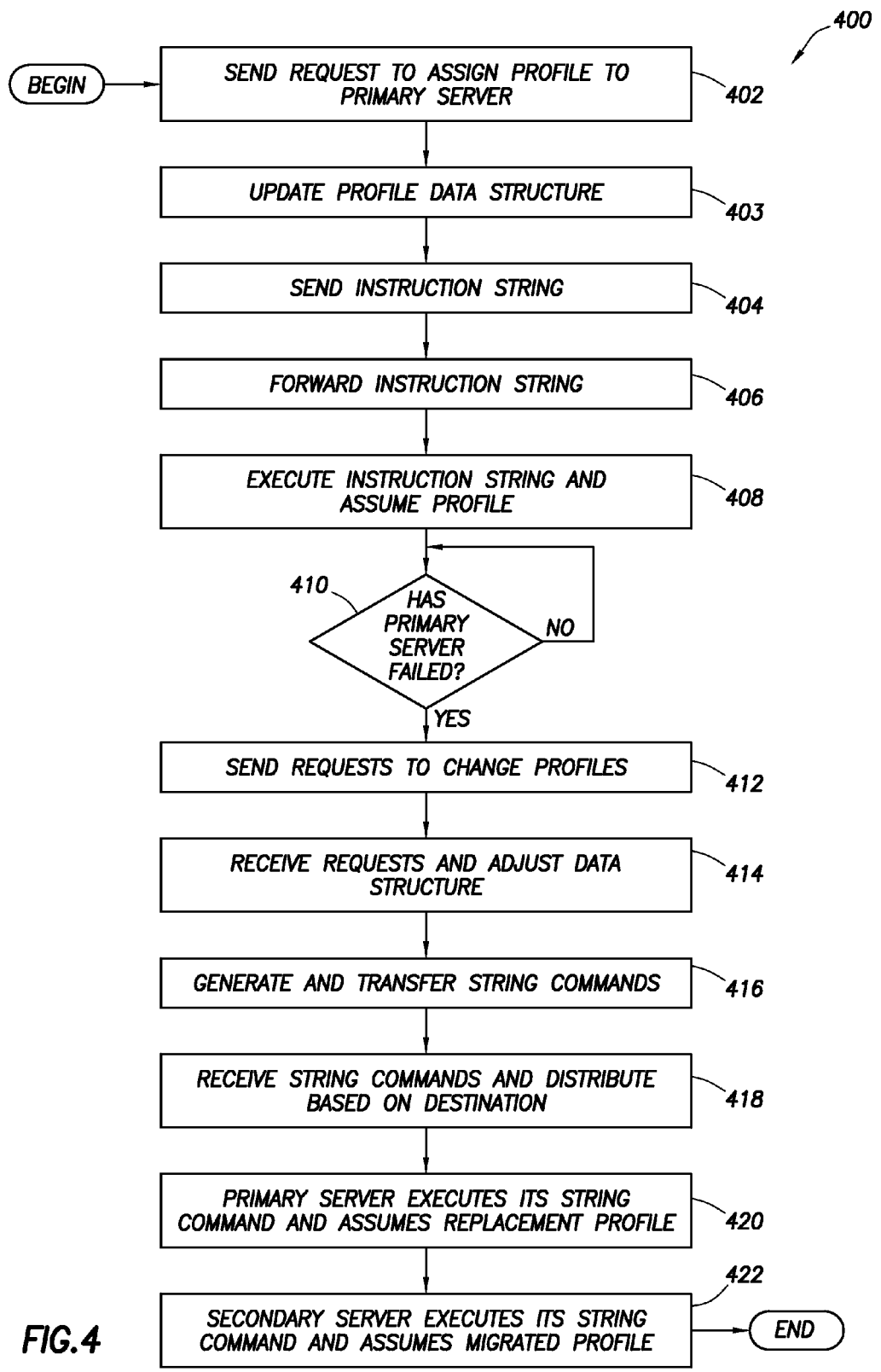
FIG. 4 shows a flow diagram of an illustrative method which may be implemented in accordance with various embodiments.

FIG. 4 shows a flow diagram of an illustrative method 400 implemented in accordance with embodiments of the invention. The various actions depicted can be performed in an order other than that shown in FIG. 4. The method 400 begins by sending a request from an administrator to a profile manager to assign a profile to a primary server (block 402). The method 400 further comprises the profile manager updating its profile data structure(s) (block 403) and sending an instruction string from the profile manager to an enclosure manager associated with the primary server (block 404). The instruction string is then forwarded to the primary server (block 406). The method 400 comprises the primary server executing the string and assuming a profile associated with one or more GUIDs (block 408).

The method 400 then comprises determining whether the primary server has failed (block 410). If the primary server has failed, the method 400 comprises the administrator sending both a request to the profile manager to change the profile of the primary server and a request to the profile manager to migrate the profile of the primary server to the backup server (block 412). The method 400 comprises the profile manager receiving the requests and adjusting its profile data structure(s) accordingly (block 414). The method also comprises the profile manager generating and transferring string commands to the enclosure manager (block 416). The enclosure manager receives the string commands and distributes the string commands according to the destinations indicated in the commands (block 418). More specifically, the string command intended for the primary server is transferred to the primary server and the string command intended for the secondary server is transferred to the secondary server.

The method further comprises the processor of the primary server executing the received string command and assuming its replacement profile (block 420). As described above, the profile of the primary server may be changed to a factory default profile, a previously assigned profile, or some predetermined profile used specifically for failed servers. The method 400 also comprises the processor of the secondary server executing its received string command and assuming the profile migrated from the failed server (block 422). In this way, one or more GUIDs previously associated with the failed server are migrated to the backup server. As described above, the profile of the primary server may be changed to a factory default profile, a previously assigned profile, or some predetermined profile used specifically for failed servers.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A network, comprising:
 a first electronic device associated with a first profile that uniquely identifies the first electronic device on the network; and
 a second electronic device coupled to the first electronic device;
 wherein the first profile is migrated to the second electronic device such that the first electronic device is no longer associated with the first profile and such that the first profile uniquely identifies the second electronic device on the network;
 wherein said first profile comprises one or more identifiers selected from the group consisting of at least one Globally Unique Identifier (GUID), media access control (MAC) addresses, fibre channel world wide names, storage area network (SAN) boot parameters and a serial number associated with the first electronic device.

2. The network of claim 1, wherein at least one of said first and second electronic devices comprises a server.

3. The network of claim 1, wherein said first profile comprises an identifier not used to identify electronics devices on the network besides the first and second electronic devices.

4. The network of claim 1, wherein the first profile is migrated to the second electronic device as a result of executing a string command issued by a control logic coupled to the first and second electronic devices.

5. The network of claim 1, wherein, after said migration, the profile enables the second electronic device to access a resource not accessible to the first electronic device.

6. The network of claim 1, wherein said migration is caused at least in part by a profile manager which comprises a data structure, and wherein the data structure is adjusted so that the profile associated with the first electronic device is associated with the second electronic device, so that the profile is no longer associated with the first electronic device, and so that the first electronic device is associated with a different, predetermined profile.

7. The network of claim 1, wherein said migration is initiated at least in part by a request to upgrade from the first electronic device to the second electronic device.

8. The network of claim 1, wherein the first profile replaces a previous profile of the second electronic device and the previous profile is transferred to a storage on the second electronic device.

9. The network of claim 1, wherein the first profile identifies the first electronic device to software code running on said first electronic device.

10. An electronic device, comprising:
 a memory coupled to a processor and comprising an identifier associated with said electronic device; and
 a port coupled to the processor and providing access to a network;
 wherein the identifier is migrated to another electronic device on the network and the identifier is no longer associated with the electronic device;
 wherein, among electronic devices on the network, the identifier is used to identify only an electronic device having said identifier;
 wherein said first profile comprises one or more identifiers selected from the group consisting of at least one Globally Unique Identifier (GUID), media access control (MAC) addresses, fibre channel world wide names, storage area network (SAN) boot parameters and a serial number associated with the first electronic device.

11. The electronic device of claim 10, wherein the electronic device comprises a server.

12. The electronic device of claim 10, wherein the identifier is migrated to said another electronic device as a result of the electronic device executing a string command received from a control logic coupled to both the electronic device and the another electronic device.

13. A method, comprising:
 on a network comprising a plurality of computers, monitoring a first computer for failure;
 migrating an identifier of the first computer to a second computer; and
 providing a different identifier to the first computer such that the first computer is no longer associated with the identifier;
 wherein, among computers on the network, the identifier is used to identify only a computer having said identifier;
 wherein said first profile comprises one or more identifiers selected from the group consisting of at least one Globally Unique Identifier (GUID), media access control (MAC) addresses, fibre channel world wide names, storage area network (SAN) boot parameters and a serial number associated with the first electronic device.

14. The method of claim 13 further allowing the second computer to access a resource using the identifier and preventing other computers on the network from accessing said resource.

15. The method of claim 13, wherein migrating said identifier comprises adjusting a data structure associated with a control logic communicably coupled to the first and second computers.

16. The method of claim 13, wherein migrating said identifier comprises replacing a previous profile of the second computer and transferring said previous profile to a storage on the second computer.

* * * * *